United States Patent [19]

Nomura et al.

[11] Patent Number: 4,676,143
[45] Date of Patent: Jun. 30, 1987

[54] PISTON SEAL DEVICE FOR RECIPROCATING COMPRESSOR

[75] Inventors: Hiroshi Nomura; Susumu Saito, both of Konan, Japan

[73] Assignee: Diesel Kiki Co., Ltd., Tokyo, Japan

[21] Appl. No.: 770,143

[22] Filed: Aug. 27, 1985

[30] Foreign Application Priority Data

Aug. 29, 1984 [JP] Japan ............... 59-130755[U]

[51] Int. Cl.[4] ............................................. F16J 9/00
[52] U.S. Cl. ........................................ 92/243; 92/249; 277/169; 277/171; 277/DIG. 6
[58] Field of Search ............... 92/243, 249, 240, 242, 92/212, 246, 248, 250, 251; 417/269; 277/170, 171, 168, 216, DIG. 6, 169, 180

[56] References Cited

U.S. PATENT DOCUMENTS

| 1,177,010 | 3/1916 | Brunskill | 92/250 X |
| 1,773,749 | 8/1930 | Petersen | 277/171 |
| 2,187,880 | 1/1940 | Kaysing | 277/216 X |
| 2,893,800 | 7/1959 | Schmidt et al. | 277/169 |
| 3,291,497 | 12/1966 | Cross | 277/169 |
| 3,678,809 | 7/1972 | Doutt | 92/249 X |

FOREIGN PATENT DOCUMENTS

| 1155295 | 10/1963 | Fed. Rep. of Germany | 277/171 |
| 826487 | 3/1938 | France | 277/216 |
| 831690 | 6/1938 | France | 277/216 |

Primary Examiner—Edward K. Look
Attorney, Agent, or Firm—Wenderoth, Lind & Ponack

[57] ABSTRACT

A piston seal device for a reciprocating compressor, having a piston slidably mounted in a cylinder bore and having a circumferential groove, and a resilient piston ring fitted in the circumferential groove of the piston and sealingly engageable with the cylinder bore. The circumferential groove includes a centrally recessed bottom wall for causing the piston ring to be resiliently and arcuately deformed to have a pair of opposite outer corner edges sealingly engageable with the cylinder bore. The piston sealing device thus provides a great sealing force both at the discharge stage and the intake stage, thereby improving the efficiency and lubrication of the compressor.

8 Claims, 12 Drawing Figures

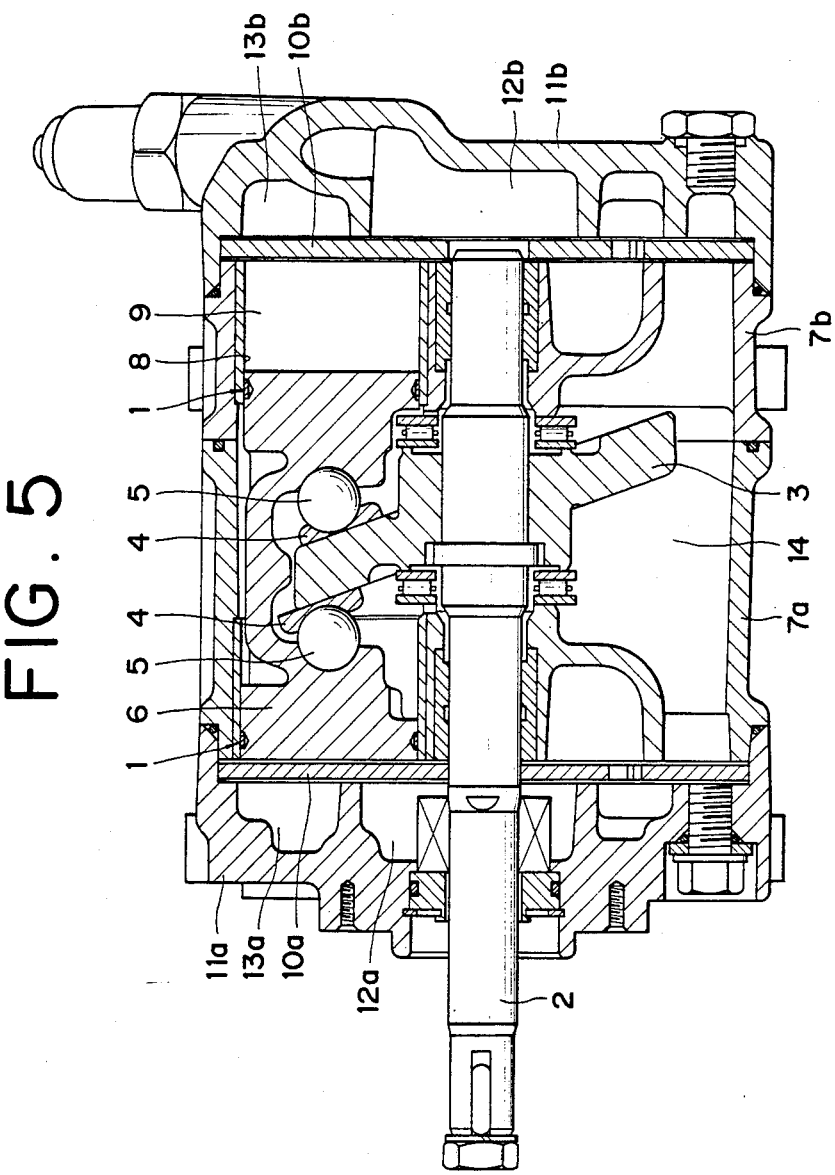

PRIOR ART

PISTON SEAL DEVICE FOR RECIPROCATING COMPRESSOR

BACKGROUND OF THE INVENTION

1. Field of the Invention

The present invention relates to a piston seal device for a reciprocating compressor having a piston reciprocating in a cylinder, and more particularly to a piston seal device employing a piston ring.

2. Description of the Prior Art

As disclosed in Japanese Patent Laid-open Publication Nos. 55-129658 and 59-47560, it is known to use a piston ring to provide a sealing interface between a stationary cylinder bore and a movable piston reciprocating therein. Also known is a piston ring in the form of a packing which is generally classified as an open-top or upwardly flared type and an open-bottom or downwardly flared type, these types being shown respectively in FIGS. 11 and 12 of the accompanying drawings.

As shown in FIGS. 11 and 12, a piston 6 has a circumferential groove 15 of a rectangular cross sectional shape in which a piston ring 16 is fitted. The piston ring 16 comprises a packing made of a resilient material such as polytetrafluoroethylene available under the trade name "TEFLON". The packing 6 has, for reasons of its manufacture, a hollow frustoconical shape in its free stage including one end biased inwardly and the other end biased outwardly. In the open-top type piston ring 16 shown in FIG. 11, an outwardly biased end is disposed in an upper circumferential groove in the piston 6 adjacent to a compression chamber 9 and with its outer corner edge held in sealing engagement with a cylinder bore 8 of a compressor housing. This arrangement advantageously provides a greater sealing force at the discharge stage than at the intake stage with the result that both mechanical and volumetric efficiencies of the compressor are improved. On the contrary, the open-bottom type piston ring 16 shown in FIG. 12 has an outwardly biased end disposed in a lower circumferential groove in the piston 6 that is remote from the compression chamber 9 with its outer corner edge held in sealing engagement with the cylinder bore 9. With this arrangement, the piston ring 16 provides a greater sealing force at the intake stage than at the discharge stage, thereby sufficiently scraping off oil from the cylinder bore 9 to prevent the excess intrusion of oil in the interface between the piston 6 and the cylinder bore 9.

Aside from the foregoing advantages, both piston rings have disadvantages in that the open-top type piston ring provides a relatively small sealing force which is likely to cause an excess oil intrusion between the interface between the piston and the cylinder bore, resulting in a seizure of the piston and the cylinder, whereas the open-bottom type piston ring causes a reduction in the efficiency of the compressor.

SUMMARY OF THE INVENTION

It is accordingly an object of the present invention to provide a piston seal device which can improve both the efficiency and the lublication of the compressor, regardless of a direction of placement of a piston ring on a piston of the compressor.

According to the present invention, the foregoing and other objects of the present invention are attained by providing a piston seal device for a reciprocating compressor, comprising: a cylinder having a cylinder bore; a piston slidably mounted in said cylinder bore and having a circumferential groove; a resilient piston ring in said circumferential groove of said piston and sealingly engageable with said cylinder bore; and said circumferential groove including a centrally recessed bottom wall for causing said piston ring to be resiliently arcuately deformed to have a pair of opposite outer corner edges sealingly engageable with said cylinder bore.

Many other advantages and features of the present invention will become manifest to those versed in the art upon making reference to the detailed description and the accompanying sheets of drawings in which preferred structural embodiments incorporating the principles of the present invention are shown by way of illustrative example.

BRIEF DESCRIPTION OF THE DRAWINGS

FIG. 5 is a cross-sectional view of a compressor including a piston seal device embodying the present invention;

DETAILED DESCRIPTION OF THE PREFERRED EMBODIMENTS

Figure 1:
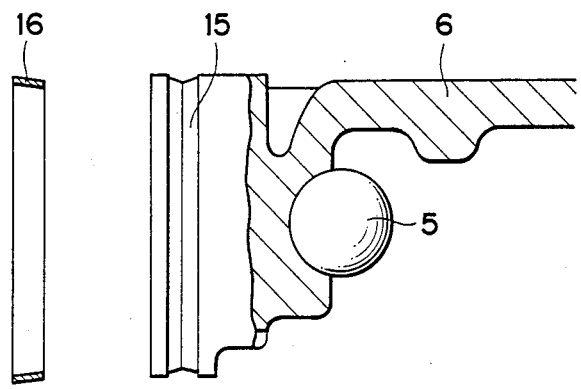
FIG. 1 is a cross-sectional view showing a piston ring disassembled from a piston.

Like reference characters designate the same or similar parts throughout the drawing figures.

The principles of the present invention are particularly useful when embodied in a piston seal device shown in FIG. 5, generally indicated by the reference numeral 1. The piston seal device 1 is accomodated in a compressor for use in an automobile air conditioner system, for example. The compressor is of the rotary tilt plate type and comprises a drive shaft 2 corotatably supporting thereon a tilt plate or disc 3 and a piston 6 coupled with the tilt plate 3 via a pair of shoes 4 and a plurality of balls 5 that are disposed on opposite sides of the tilt plate 3. With this construction, upon rotation of the drive shaft 2, the tilt plate 3 is rotated to cause the piston 6 to axially reciprocate in a cylinder bore 8 defined by a pair of continuous cylinder blocks 7a, 7b. Reciprocating movement of the piston 6 varies the volume of each compression chamber 9 which is defined jointly by the piston 6, cylinder bore 8 and one of a pair of opposite valve plates 10a, 10b, thereby causing alternate opening and closing motions of intake and discharge valves (not shown). A refrigerant gas is drawn alternately from opposite low pressure chambers 12a, 12b in respective cylinder heads 11a, 11b into the compression chambers 9, then is compressed and finally is discharged into high-pressure chambers 13a, 13a, 13b of the respective cylinder heads 11a, 11b. The compressor employs a self lubrication system such as an oil-splash system wherein oil contained in an internal reservoir of cylinder blocks 7a, 7b is splashed during the rotation of the tilt plate 3 into a tilt plate receiving chamber 12 to thereby form an oil mist and is distributed to the friction points such as the interface between the piston 6 and the cylinder bore 8.

Figure 2:
FIG. 2 is a cross-sectional view of a piston ring blank from which the piston shown in FIG. 1 is formed.

As shown in FIGS. 1 through 4, the piston seal device 1 (FIG. 5) comprises a circumferential groove 15 in a piston 6 and a piston ring 16 fitted in the groove 15. The piston ring 16 is made of a resilient low friction material, such as polytetrafluoroethylene which is available under the trade name "TEFLON". To make the piston ring 16, a flat annular blank 16' is stamped out from a polytetrafluoroetylene film as shown in FIG. 2, and then is shaped by a shaping die into a hollow frustoconical shape as shown in FIG. 1.

Figure 3:
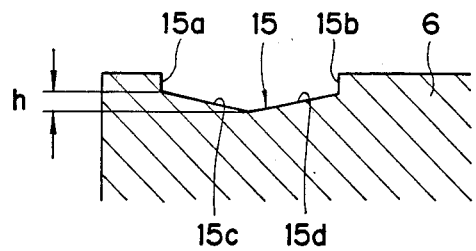
FIG. 3 is an enlarged cross-sectional view of a portion of the piston of FIG. 1, the view showing a circumferential groove for receiving the piston ring of FIG. 1.
Figure 4:
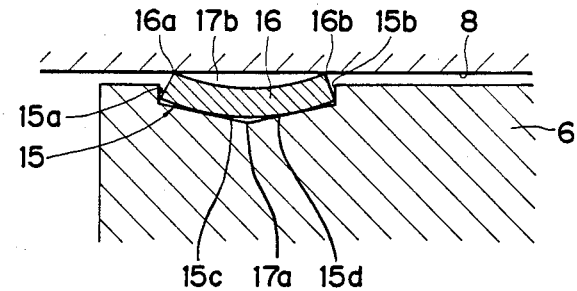
FIG. 4 is a view similar to FIG. 3, showing the piston ring received in the groove of a piston in sealing engagement with a cylinder bore.
Figure 6:
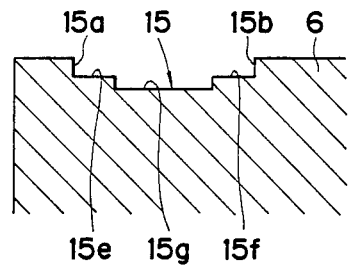
FIGS. 6 through 10 are cross-sectional views showing various modifications embodying the present invention.

The groove 15, as shown in FIGS. 3 and 4, includes a pair of opposed side walls 15a, 15b extending perpendicular to the axis of the piston 6 and a centrally recessed bottom wall, the bottom wall in this embodiement being comprised of a pair of sloped bottom wall portions 15c, 15d extending downwardly inwardly from the respective side walls 15a, 15b and meeting at the center of the groove 15. The recessed bottom wall has a depth h (FIG. 3). The height of the side walls 15a, 15b is slightly smaller than the thickness of the piston ring 16. With this construction, when the piston ring 16 is fitted in the groove 15, it is deformed accurately to follow the contour of the groove 15 with its opposite ends partly projecting beyond the peripheral surface of the cylinder 6. The piston ring 16 is urged under its own resiliency against the sloped bottom wall portions 15c, 15d. Accordingly, when the piston 6 with the piston ring 16 mounted thereon is fitted in the cylinder bore 8 as shown in FIG. 4, the piston ring 16 sealingly engages at its opposite outer corner edges 16a, 16b with the cylinder bore 8. In this condition, there are defined two spaces 17a, 17b on opposite sides of the piston ring 16.

In operation, drive shaft 2 is driven to rotate the tilt plate 3 whereupon the piston 6 reciprocates along the cylinder bore 8 to compress a refrigerant gas in cooperation with the intake and discharge valves. In this instance, the outer corner edges 16a, 16b of the piston ring 16 slide along the cylinder bore 8. While the piston 6 is in the discharge stage, the corner edge 16a provides a great sealing force to thereby improve the efficiency of the compressor. On the contrary during movement of the piston 6 at the intake stage, the corner edge 16b provides a great sealing force to scrape off oil from the cylinder bore 8, thereby preventing an excess consumption of lubricant oil which would therewise occur due to intrusion of oil in the compression chamber 9 through the interface between the piston 6 and the cylinder bore 8. The oil is then mixed up with the refrigerant gas and is finally discharged from the compressor. Continuous operation of the compresor causes a shortage of lubricant oil which would result in a seizure of the piston 6 and the cylinder bore 8.

Figure 7:
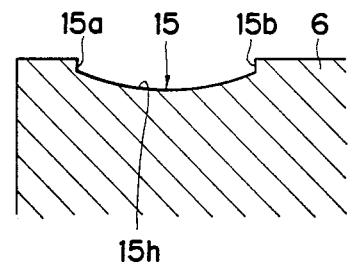
Figure 8:
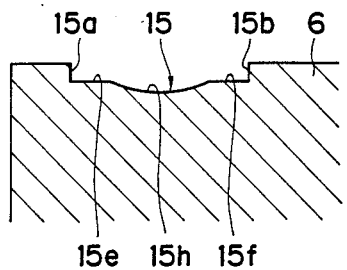
Figure 9:
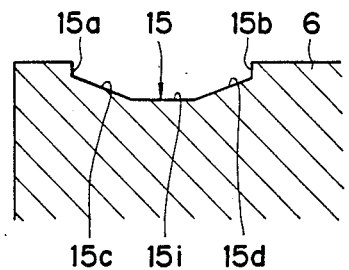
Figure 10:
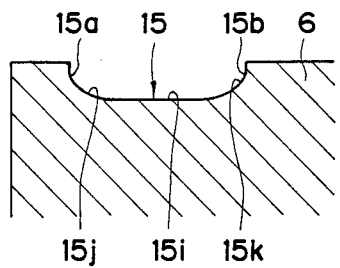
Figure 11:
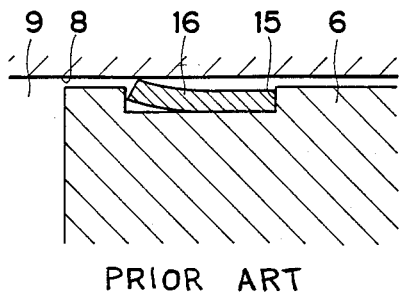
FIGS. 11 and 12 are fragmentary cross-sectional views showing conventional piston seal devices.
Figure 12:
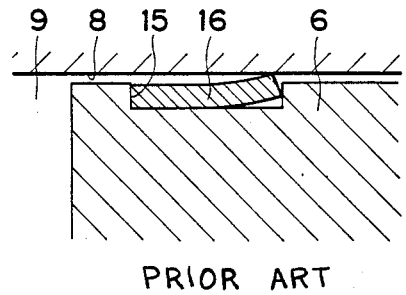

Various modifications of the present invention are shown in FIGS. 6 through 10 each of which includes a circumferential groove 15 having the substantially same sidewalls 15a, 15b as the groove shown in FIGS. 3 and 4, and a centrally recessed bottom wall which is different from the bottom wall of the groove shown 4. GS. 3 and The circumferential groove 15 shown in FIG. 6 has a bottom wall including a stepped central recessed portion 15g disposed between a pair of flat bottom wall portions 15e, 15f extending perpendicularly from the respective side walls 15a, 15b in a direction toward each other. In FIG. 7, the groove 15 has an arcuately downwardly concave bottom wall 15h. The groove 15 shown in FIG. 8 is similar to the groove 15 of FIG. 6 but differs therefrom in that a bottom wall includes an arcuate central recessed portion 15h disposed between opposite flat bottom wall portions 15e, 15f. In FIG. 9, the groove 15 has a bottom wall including a pair of oppositely sloped portions 15c, 15d extending downwardly inwardly from the sidewalls 15a, 15b and meeting at a central flat portion 15i. The groove 15 shown in FIG. 10 has a pair of rounded end portions 15j, 15k contiguous to the respective side walls 15a, 15b and a central flat portion 15i extending between the rounded portions 15j, 15k. All the grooves 15 shown in FIGS. 6–10 are effective to resiliently deform the piston ring 16 in the same manner as achieved by the groove 15 shown in FIG. 3.

The piston seal devices according to the present invention have various advantages. The piston ring has a circumferential groove having a centrally recessed bottom wall for causing the piston ring fitted therein to resiliently deform so at to have opposite end portions partly projecting beyond the periphery of the piston. The piston ring thus deformed is engageable with the cylinder bore at two opposite outer corner edges. The piston ring provides a great sealing force both at the discharge stage and the intake stage, thereby increasing the efficiency of the compressor without causing an excess consumption of lublicant oil. The piston ring is attachable to the piston in either direction with respect to the compression chamber, thereby providing an easy and time-saving attachment of the piston ring.

Although various minor modifications may be suggested by those versed in the art, it should be understood that the scope of the invention shall be construed in accordance with the appended claims.

What is claimed is:

1. A piston seal device comprising:
   a cylinder;
   a piston slidably mounted within said cylinder for reciprocating within said cylinder, said piston having an annular groove in the outer circumference thereof, said groove defined by first and second spaced apart side walls extending inward from the outer circumference for defining the sides of said groove and a bottom wall extending between said side walls and defining the bottom of said groove, said bottom wall having a depth at approximately the center thereof as measured from the outer circumference of said piston that is greater than the length of each of said sidewalls terminating at said bottom wall; and
   a resilient frustoconical piston ring having a first end having an outer circular corner edge defining the outer diameter of said first end and a second end having an outer circular corner edge defining the outer diameter of said second end, said outer diameter of said first end being greater than the outer diameter of said second end, said piston ring being disposed in said groove with said outer corner edge of said first end sealingly contacting said cylinder in which said piston is mounted and with said second end urged by said bottom wall toward said cylinder to arcuately deform said frustoconical piston ring for causing said piston ring to be seated on said bottom wall and said outer edge of said second end to sealingly contact said cylinder.

2. A piston seal device according to claim 1, wherein said sidewalls comprise a pair of opposed sidewalls extending perpendicular to the longitudinal axis of said piston, and said bottom wall includes a pair of sloped bottom wall portions extending downwardly and inwardly from said sidewalls, respectively.

3. A piston seal device according to claim 2, wherein said sloped bottom wall portions meet at the center of said groove.

4. A piston seal device according to claim 2, wherein said bottom wall includes a flat portion at the center thereof and said sloped bottom wall portions meet said central flat portion at both sides thereof respectively.

5. A piston seal device according to claim 1 wherein said said sidewalls comprise a pair of opposed sidewalls extending perpendicular to the longitudinal axis of said piston, and said bottom wall includes a pair of flat wall portions extending perpendicularly from the respective sidewalls toward each other and a stepped central recessed portion disposed between said flat wall portions.

6. A piston seal device according to claim 1, wherein said bottom wall comprises an arcuate inwardly concave wall.

7. A piston seal device according to claim 1, wherein said sidewalls comprises a pair of opposed sidewalls extending perpendicular to the longitudinal axis of said piston, and said bottom wall includes a pair of flat wall portions extending perpendicularly from the respective sidewalls toward each other and a central arcuately recessed portion.

8. A piston seal device according to claim 1, wherein said sidewalls comprise a pair of opposed sidewalls extending perpendicular to the longitudinal axis of said piston, and said bottom wall includes a pair of rounded end portions contiguous to the respective side walls and a flat central portion extending perpendicular relative to said side walls.

* * * * *